US008045556B2

(12) United States Patent
Yoo

(10) Patent No.: US 8,045,556 B2
(45) Date of Patent: Oct. 25, 2011

(54) APPARATUS AND METHOD FOR SENDING MULTICAST PACKET IN MOBILE DIGITAL BROADCAST SYSTEM

(75) Inventor: Seok-Man Yoo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 940 days.

(21) Appl. No.: 12/021,597

(22) Filed: Jan. 29, 2008

(65) Prior Publication Data

US 2008/0181189 A1     Jul. 31, 2008

(30) Foreign Application Priority Data

Jan. 29, 2007    (KR) .......................... 10-2007-0008829

(51) Int. Cl.
*H04L 12/28*    (2006.01)

(52) U.S. Cl. ........................................ 370/390; 370/432

(58) Field of Classification Search .................. 370/338, 370/389, 390, 392, 432, 474, 475, 328
See application file for complete search history.

(56) References Cited

U.S. PATENT DOCUMENTS

| 2007/0049191 | A1* | 3/2007 | Tomobe et al. | 455/3.01 |
| 2007/0232226 | A1* | 10/2007 | Kajitani | 455/7 |
| 2007/0250893 | A1* | 10/2007 | Akiyama et al. | 725/131 |
| 2007/0255845 | A1* | 11/2007 | Bowen | 709/231 |
| 2007/0268883 | A1* | 11/2007 | Quelle et al. | 370/349 |
| 2008/0176559 | A1* | 7/2008 | Vare et al. | 455/432.1 |

FOREIGN PATENT DOCUMENTS

| EP | 1 388 993 | 2/2004 |
| KR | 1020040066826 | 7/2004 |
| WO | WO 2006/027749 | 3/2006 |
| WO | WO 2006/136203 | 12/2006 |

OTHER PUBLICATIONS

"IPDC in DVB-H: Technical Requirements, CBMS1026 v1.0.0 Rev. 1/TM 3095 Rev.2" Internet Citation, XP002990830, Jun. 23, 2004.

* cited by examiner

*Primary Examiner* — Brian Nguyen
(74) *Attorney, Agent, or Firm* — The Farrell Law Firm, P.C.

(57) ABSTRACT

Apparatus and method for sending a multicast packet in a mobile digital broadcast system are provided. The mobile digital broadcast system includes a broadcaster for indicating the designated recipient in an Internet Protocol (IP) header of a multicast packet and including a temporary IP address of the recipient in the IP header when multicasting data of a designated recipient; a receiver for providing the received multicast packet to an application program for outputting a digital broadcasting when the receiver joins a group of the multicast packet and the recipient is designated to the receiver upon receiving the multicast packet; and an IP allocating server for allocating a temporary IP address when the receiver requests to allocate the temporary IP address, storing the allocated temporary IP address and ID information of the receiver, and sending the allocated temporary IP address and the ID information of the receiver to the broadcaster.

23 Claims, 7 Drawing Sheets

APPARATUS AND METHOD FOR SENDING MULTICAST PACKET IN MOBILE DIGITAL BROADCAST SYSTEM

PRIORITY

This application claims priority under 35 U.S.C. §119(a) to an application filed in the Korean Intellectual Property Office on Jan. 29, 2007 and assigned Serial No. 2007-8829, the contents of which are herein incorporated by reference.

BACKGROUND OF THE INVENTION

1. Field of the Invention

The present invention relates generally to an apparatus and method for sending a multicast packet in a mobile digital broadcast system, and in particular, to an apparatus and method for sending a multicast packet in a mobile digital broadcast system such that a broadcaster of the mobile digital broadcast sends the multicast packet and a receiver determines whether the multicast packet is a necessary packet by merely examining the header information.

2. Description of the Related Art

Digital Video Broadcasting-Handheld (DVB-H), which is a technology combining mobile and digital broadcastings, is rapidly spreading over Europe. The DVB-H broadcasts information to a user, such as Audio/Video (A/V) data, Entitlement Control Message (ECM), Entitlement Management Message (EMM), and Electronic Service Guide (ESG) data, by using an Internet Protocol Data Cast (IPDC) technique, which encapsulates the information in an IP packet.

DVB-H broadcasting basically works in a multicast manner to reduce the load of an irrelevant host because of the surge in broadcasting. The multicast technology sends a packet only to a host joining the group. How a general multicast packet is generated, transmitted, and received is described by referring to FIGS. 1 and 2.

FIG. 1 is a flowchart of a method for generating and sending a multicast packet at a general multicast transmitter in the prior art. When data to be multicast is generated in step 100, the general multicast transmitter of FIG. 1 inputs a multicast group address in a destination Internet Protocol (IP) address field of an IP header in step 102, completes the IP header generation in step 104, and multicasts a packet to a receiver by attaching data after the IP header in step 106.

FIG. 2 is a flowchart of a method for receiving and processing a multicast packet at a general multicast receiver in the prior art. Upon receiving a multicast packet in step 200, the multicast receiver of FIG. 2 determines whether the destination IP address of the IP header of the received packet matches a group address of the receiver in step 202.

When the two addresses match in step 202, the multicast receiver forwards a received multicast packet to an application program in step 204. By contrast, when the two addresses are different from each other in step 202, the multicast receiver discards the received multicast packet in step 206.

While a DVB-H system alleviates the load of the irrelevant host by operating in the multicast manner, there still exists a problem. To control the viewing authority for a scrambler channel of digital broadcasting channels, the DVB-H system employs a Conditional Access System (CAS) module. When a user purchases a scrambler channel using CALL/HTTP, the DVB-H system sends a UDP packet, being Entitlement Management Message (EMM), which contains a unique address and the purchased access authority of the corresponding user, to every receiver joining the multicast group. The receiver receives the EMM through a socket and forwards the EMM to its CAS. Upon receiving the EMM, the CAS determines whether the received EMM is destined for itself based on the ID information. When the received EMM is correctly received, the receiver uses the EMM to access the scrambler channel. When the received EMM is incorrectly received, the receiver discards the received EMM. The broadcaster of the DVB-H system sends the same EMM over a certain time period in the case where the EMM is incorrectly received at the receiver. In other words, when receiving the multicast packet containing the EMM, the receiver of the DVB-H system needs to forward the packet to the CAS being the application program and the CAS needs to determine whether the packet is necessary by comparing the ID information of the EMM as in step 204 of FIG. 2.

Thus, if 100,000 users purchase the access authority in that situation, the CAS of the receiver is subject to the unnecessary load while processing at least 99,999 EMMs, excluding one EMM corresponding to itself.

SUMMARY OF THE INVENTION

An aspect of the present invention is to solve at least the above problems and/or disadvantages and to provide at least the advantages below. Accordingly, an aspect of the present invention is to provide an apparatus and method for sending a multicast packet in a mobile digital broadcast system.

Another aspect of the present invention is to provide an apparatus and method for sending a multicast packet destined for a certain receiver in a mobile digital broadcast system.

Yet another aspect of the present invention is to provide an apparatus and method for sending a multicast packet in a mobile digital broadcast system such that a broadcaster of the mobile digital broadcast system sends the multicast packet and a receiver determines whether the received packet is necessary or not by merely examining the header information.

Still another aspect of the present invention is to provide an apparatus and method for sending a multicast packet in a mobile digital broadcast system such that a transmitter of the mobile digital broadcast system sends an EMM as a multicast packet containing information relating to a designated receiver in a packet header and the receiver determines whether the received packet is necessary or not by merely examining the header information.

The above aspects are achieved by providing a mobile digital broadcast system for sending a multicast packet with a designated recipient. The packet includes an IP allocating server, a receiver and a broadcaster when multicasting data to a designated recipient. The broadcaster indicates the designated recipient in an IP header of the multicast packet and includes a temporary IP address of the recipient in the IP header; upon receiving the multicast packet, the receiver provides the received multicast packet to an application program for outputting a digital broadcasting when the receiver joins a group of the multicast packet and the recipient is designated to the receiver; and the IP allocating server allocates a temporary IP address when the receiver requests the allocation of the temporary IP address, stores the allocated temporary IP address and ID information of the receiver, and sends the allocated temporary IP address and the ID information of the receiver to the broadcaster.

According to one aspect of the present invention, a broadcaster of a mobile digital broadcast system for sending a multicast packet with a designated recipient, includes a Conditional Access System (CAS) for generating an Entitlement Management Message (EMM) including authority to view a scrambler broadcasting; an IP manager for receiving from an IP allocating server connected over a network and managing the temporary IP address of a receiver, which is a recipient; and when receiving the EMM data from the CAS, an IP packet encapsulator for, indicating a recipient in an IP header of a generated multicast packet, including a temporary IP address in the IP header by confirming the temporary IP address of the recipient through the IP manager, and generating the multicast packet with the IP header appended to the EMM data.

According to another aspect of the present invention, a receiver of a mobile digital broadcast system for sending a multicast packet with a designated recipient, includes an IP manager and an IP layer. The IP manager requests the IP allocating server to allocate a temporary IP address over a network when a digital broadcast viewing is requested, receives and manages the temporary IP address from the IP allocating server; and upon receiving a multicast packet the IP layer provides the received multicast packet to an application program for outputting the digital broadcast when a group of the multicast group is joined by the receiver and the recipient of the multicast group is designated to the receiver.

According to yet another aspect of the present invention, a method for sending a multicast packet with a designated recipient in a broadcaster of a mobile digital broadcast system, includes generating an Entitlement Management Message including authority to view a scrambled broadcasting; indicating a recipient in an IP header of a multicast packet including the EMM; confirming a temporary IP address of the recipient; inputting the temporary IP address in the IP header of the multicast packet; and outputting the multicast packet with the appended IP header.

According to still another aspect of the present invention, a method for receiving a multicast packet with a designated recipient in a receiver of a mobile digital broadcast system, includes, determining whether a group of the received multicast packet is a group joined by the receiver upon receiving a multicast packet; determining whether a recipient of the multicast packet is designated or not by examining an IP header of the multicast packet when the receiver joins the group of the multicast packet; determining whether the receiver is the designated recipient of the multicast packet by examining the IP header of the multicast packet when the recipient of the multicast packet is designated; and providing the received multicast packet to an application program to view a digital broadcasting when the receiver is the designated recipient of the multicast packet.

According to a further aspect of the present invention, a method for allocating a temporary IP address for sending and receiving a multicast packet with a designated recipient in an IP allocating server of a mobile digital broadcast system, includes allocating and sending a temporary IP address to the receiver when a receiver requests the allocation of a temporary IP address, storing the allocated temporary IP address and ID information of the receiver; and sending the allocated temporary IP address and the ID information of the receiver to a broadcaster.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for sending a multicast packet in a mobile digital broadcast system such that a broadcaster of the mobile digital broadcast system sends an Entitlement Management Message (EMM) as a multicast packet containing information relating to a destined receiver in a packet header and the receiver determines whether the received packet is necessary by examining only header information.

Note that the multicast packet sending method of the present invention is applicable not only to the mobile digital broadcast system but also a single recipient for which the multicast packet is destined for. Hereafter, the general structure of a Digital Video Broadcasting-Handheld (DVB-H) mobile digital broadcast system is illustrated.

Figure 3:
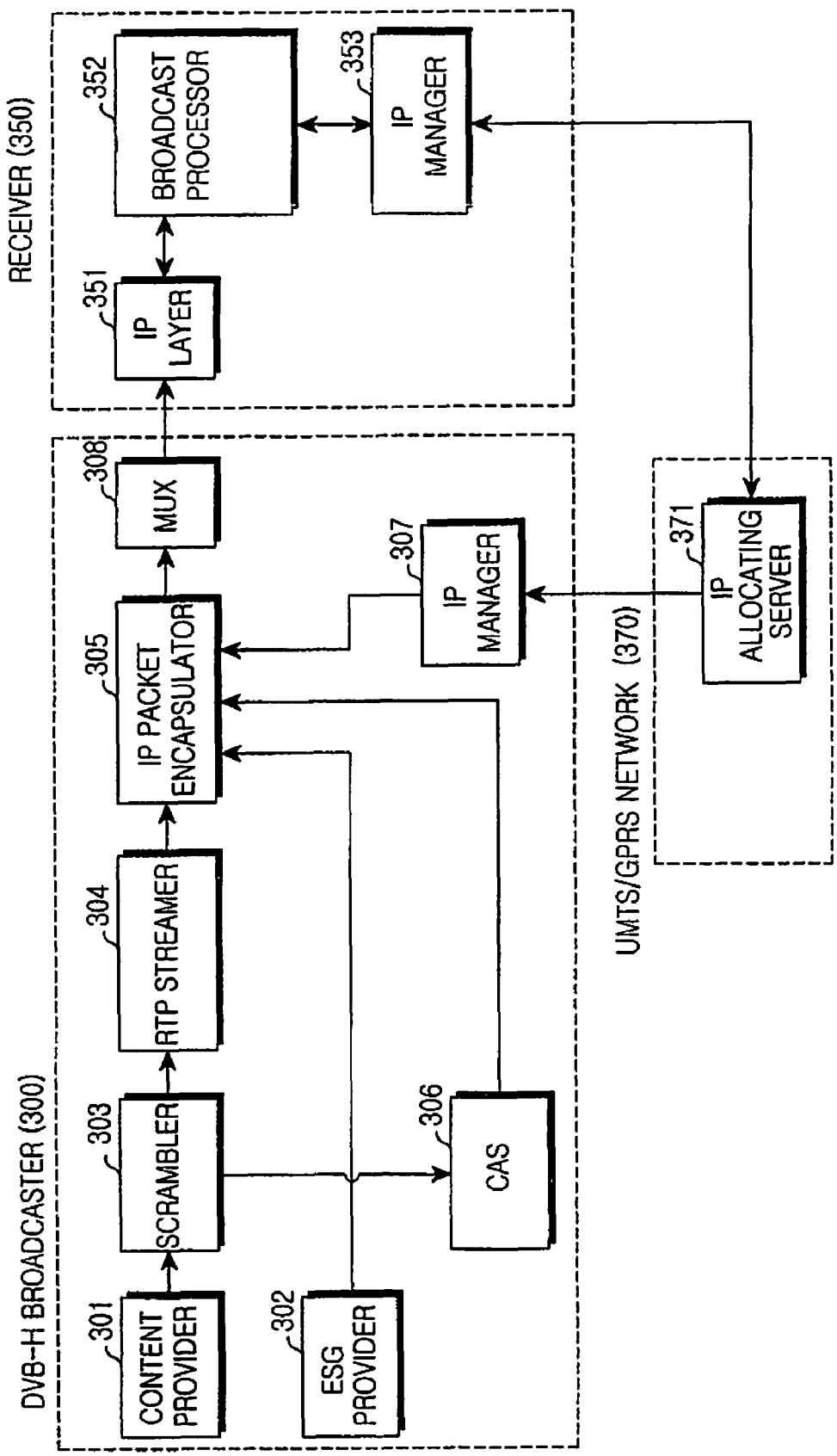
FIG. 3 is a block diagram of a mobile digital broadcast system, which sends a multicast packet containing receiver information according to the present invention.

The mobile digital broadcast system of FIG. 3 includes a DVB-H broadcaster 300, a receiver 350, and an Internet Protocol (IP) allocating server 371 positioned in a Universal Mobile Telecommunications System (UMTS)/General Packet Radio Service (GPRS) network 370.

DVB-H broadcaster 300 includes a content provider 301, an Electronic Service Guide (ESG) provider 302, a scrambler 303, a Real-time Transport Protocol (RTP) streamer 304, an IP packet encapsulator 305, a Conditional Access System (CAS) 306, an IP manager 307, and a multiplexer (MUX) 308.

Content provider 301 selects and outputs broadcast channels and contents. ESG provider 302 generates and outputs information relating to the channels to provide the channel information to a user. The channel information output from ESG provider 302 includes information relating to channel titles, IP address/UDP port of a server for receiving AN stream of the corresponding channel, IP address/port of ECM/EMM server, and contents broadcast by time zone.

Scrambler 303 receives the output AN data when the channel output from content provider 301 is a scrambler channel, encrypts the AN data using a time-variant key (TEK). When the channel output from content provider 301 is a free channel, scrambler 303 receives and outputs the A/V data without the encryption.

RTP streamer 304 controls real-time data transfer to reproduce the A/V data received from scrambler 303 in real time.

IP packet encapsulator 305 generates and outputs an IP packet by adding a UDP header and an IP header to the RTP-packetized A/V data fed from streamer 304 and the ECM data and the EMM data fed from CAS 306. When receiving the EMM data from CAS 306, IP packet encapsulator 305 includes a designated recipient into the IP header, examines a temporary IP address according to ID information of the recipient through IP manager 307, and includes the temporary IP address in the header. The structure of the IP packet carrying the EMM data is explained by referring to FIG. 4.

Figure 4:
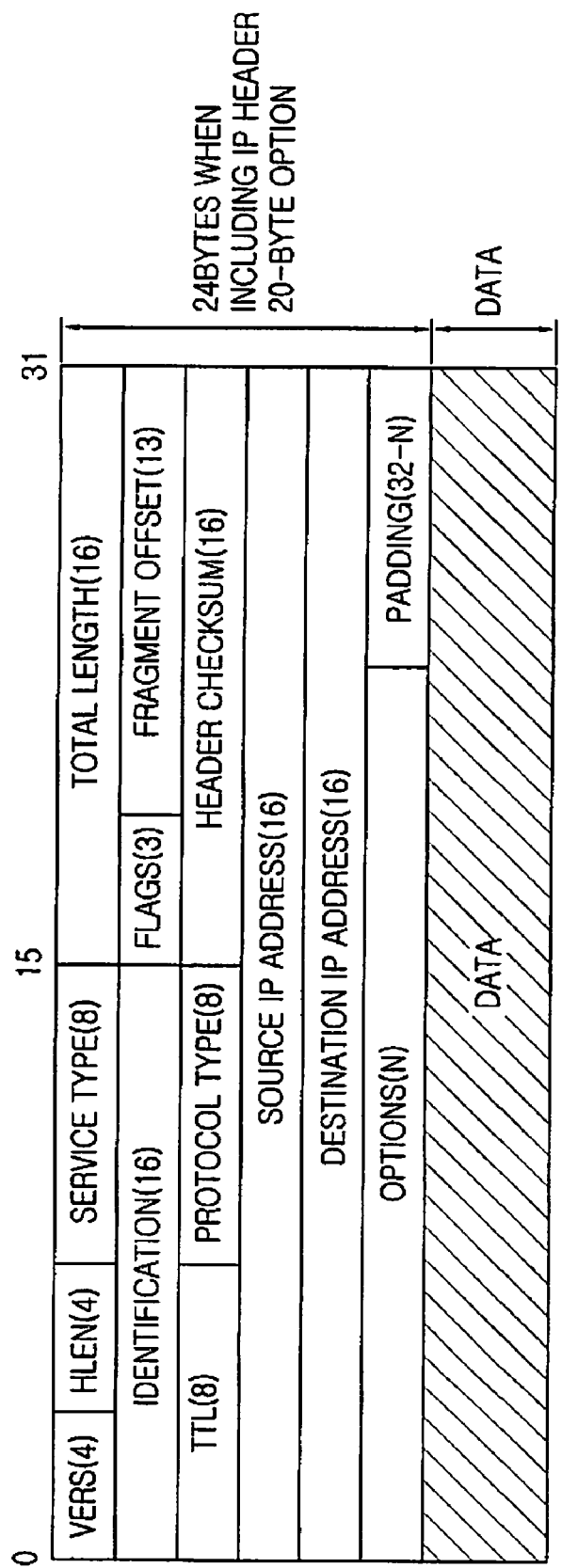
FIG. 4 is a diagram of the multicast packet transmitted by a broadcaster of the mobile digital broadcast system according to the present invention.

FIG. 4 shows the structure of the IP packet of the multicast type for carrying the EMM data. IP packet encapsulator 305 indicates the designated recipient in the multicast packet by setting the first bit of the IP header to '1', and inputs the temporary IP address confirmed through IP manager 307 in a source IP address field of the IP header. The other fields, excluding those two fields, conform to RFC 791 Internet Protocol.

CAS 306 grants the user access to the scrambled broadcast contents and allows only the authorized user to view the broadcasting. When receiving the encrypted key from scrambler 303, CAS 306 re-encrypts the decryption key with the encrypted key so that the authorized user can view the encrypted broadcasting, and outputs the generated ECM data to IP packet encapsulator 305. Also, CAS 306 generates EMM data for decrypting the ECM data in order to acquire the decryption key, which is the broadcast access right, and outputs the generated EMM data to IP packet encapsulator 305. The EMM data is data destined for the user having the broadcasting access authority.

IP manager 307 receives the temporary IP addresses assigned to the users who request to view the digital broadcasting by IP allocating server 371, together with the ID information of the recipients who are assigned the temporary IP addresses by communicating with IP allocating server 371 over the UMTS/GPRS network, and provides the received data to IP packet encapsulator 305. Next, when the receiver assigned the temporary IP address requests to cancel the temporary IP address, IP manager 307 informs IP packet encapsulator 305 of the cancellation request and cancels the assigned temporary IP address.

MUX 308 transmits the IP packets respectively containing the EMM, the ECM, and the A/V data fed from IP packet encapsulator 305 at the same time.

Receiver 350 includes an IP layer 351, a broadcast processor 352, and an IP manager 353.

Figure 1:
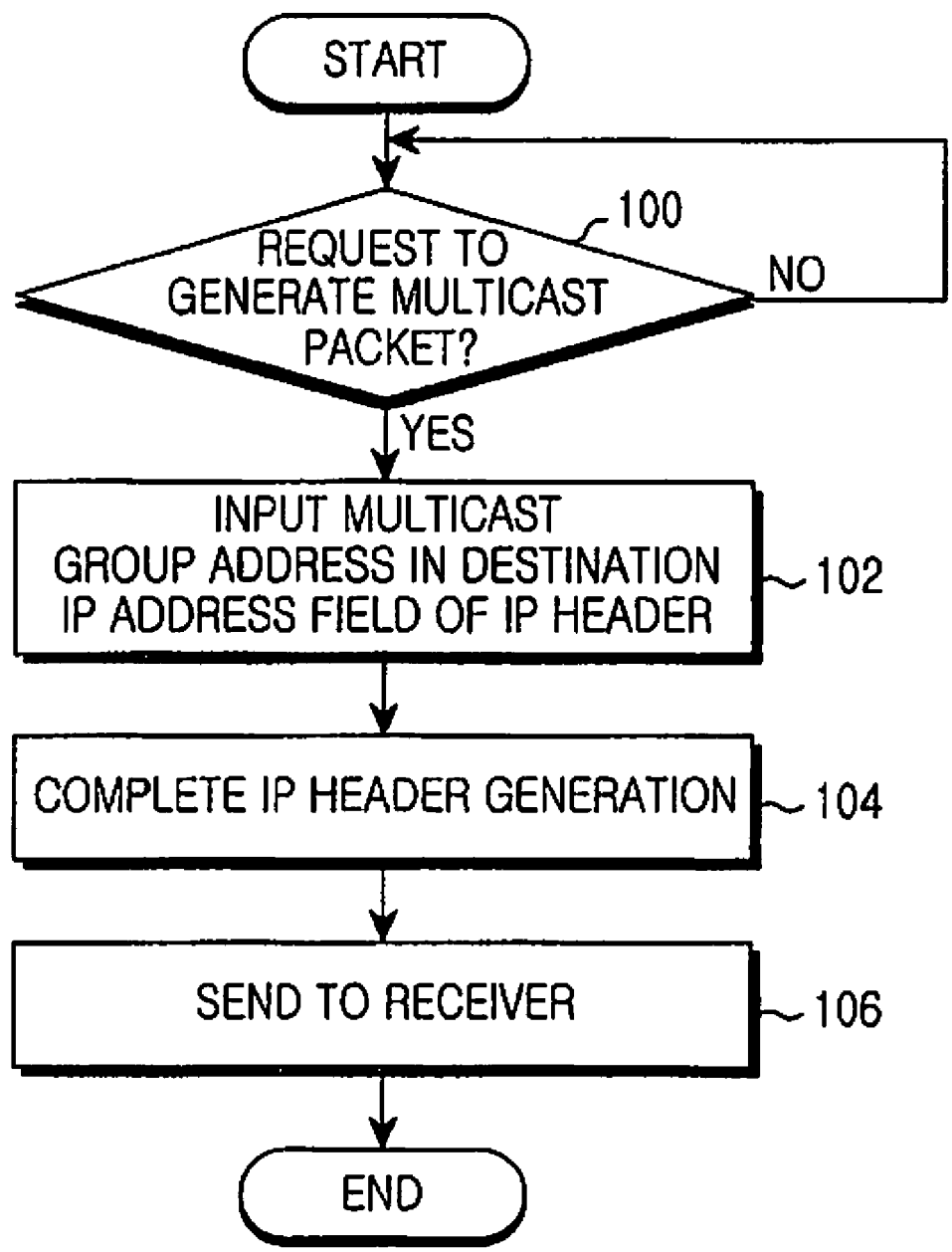
FIG. 1 is a flowchart of a method for generating and sending a multicast packet at a general multicast transmitter in the prior art.
Figure 2:
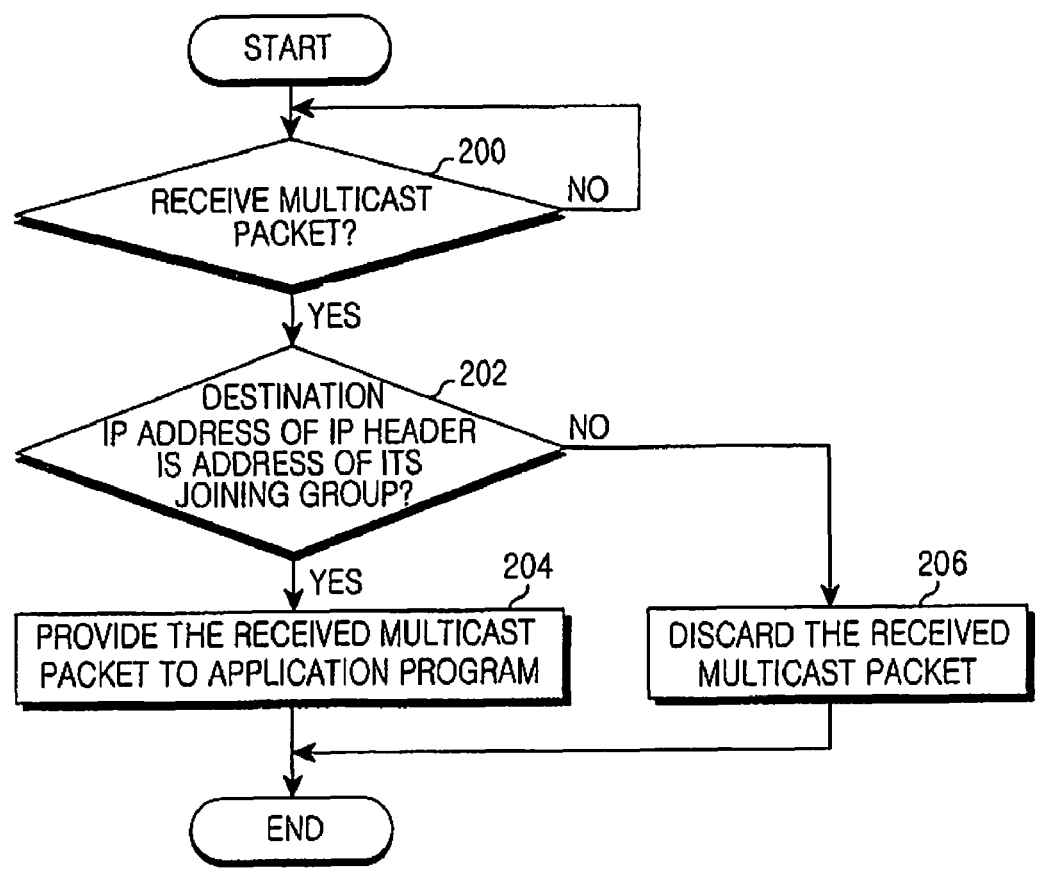
FIG. 2 is a flowchart of a method for receiving and processing a multicast packet at a general multicast receiver in the prior art.

When the received multicast packet belongs to the group of receiver 350 and its recipient is not designated, IP layer 351 processes the multicast packet as in FIG. 2 of the prior art. By contrast, when the received multicast packet belongs to the group of receiver 350 and its recipient is designated, IP layer 351 determines whether receiver 350 is the designated recipient by examining the source IP address of the IP header of the multicast packet. When the source IP address is the temporary IP address assigned to receiver 350, which is fed from IP manager 535, IP layer 351 provides the multicast packet to broadcast processor 352. When the source IP address is different from the assigned temporary IP address, IP layer 351 discards the received multicast packet because receiver 350 is not the destined recipient. Since IP layer 351 discards the incorrectly received multicast packet, the load of broadcast processor 352 can be reduced in the subsequent procedures.

Broadcast processor 352 controls to output the A/V data received according to the DVB-H broadcast specification through a display (not shown) and a speaker (not shown). In doing so, when the received broadcast channel is the scrambled channel, broadcast processor 352 controls to decrypt the scrambled channel with the decryption key contained in the ECM by decrypting the ECM with the received EMM and then to output the scrambled channel.

When broadcast processor 352 detects the broadcast view request, IP manager 353 requests the allocation of the temporary IP address and acquires the allocated temporary IP address by communicating with IP allocating server 371 over the UMTS/GPRS network. When broadcast processor 352 terminates the broadcast viewing, IP manager 353 requests IP allocating server 371 to cancel the assigned temporary IP address.

IP allocating server 371, which communicates with receiver 350 over the UMTS or GPRS network 370, allocates the temporary IP address when receiver 350 requests the allocation of the temporary IP address, stores the allocated temporary IP address and the ID information of receiver 350, which assigned the temporary IP address, and sends the allocated temporary IP address and ID information of receiver 350 to DVB-H broadcaster 300. Next, when receiver 350 requests to cancel the allocated temporary IP address, IP allocating server 371 sends the temporary IP address to be canceled and the ID information of receiver 350 requesting the cancellation to DVB-H broadcaster 300, and cancels the assigned temporary IP address.

Now, the method for sending the multicast packet with the designated recipient in the mobile digital broadcast system is explained by referring to the drawing.

Figure 5:
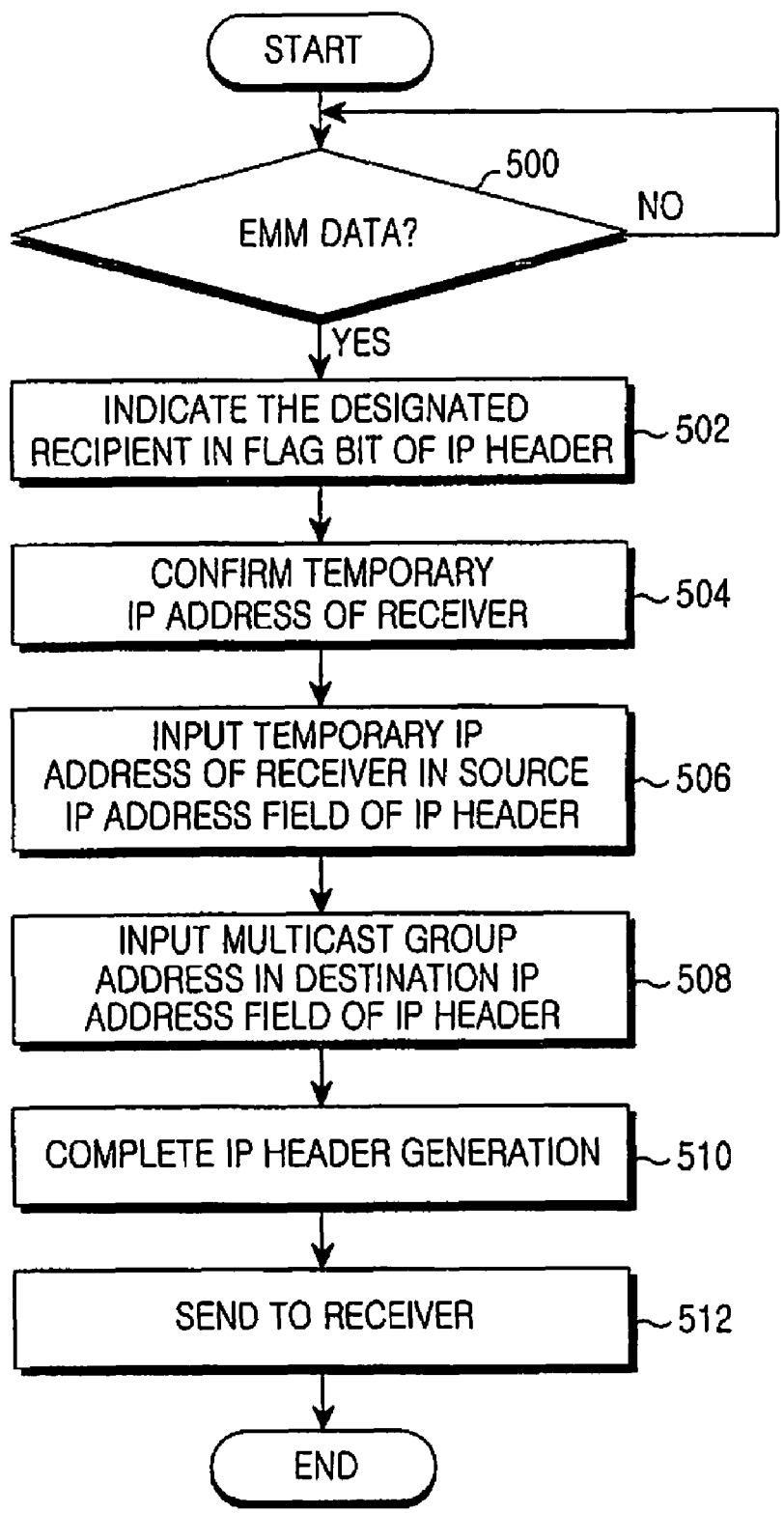
FIG. 5 is a flowchart of a method for generating and sending the multicast packet at the broadcaster of the mobile digital broadcast system according to the present invention.

In FIG. 5, when EMM data to be sent is generated in step 500, the broadcaster of the mobile digital broadcast system indicates a multicast packet with the designated recipient by setting the first bit of the flags of the IP header in step 502, confirms the temporary IP address of the destined receiver in step 504, inputs the confirmed temporary IP address in the source IP address field of the IP header in step 506, inputs the multicast group address in the destination IP address field of the IP header in step 508, completes the IP header generation by generating other fields of the IP header according to the standard specification in step 510, and broadcasts the multicast packet containing the EMM data with the IP header appended to the receivers of the multicast group in step 512.

Figure 6:
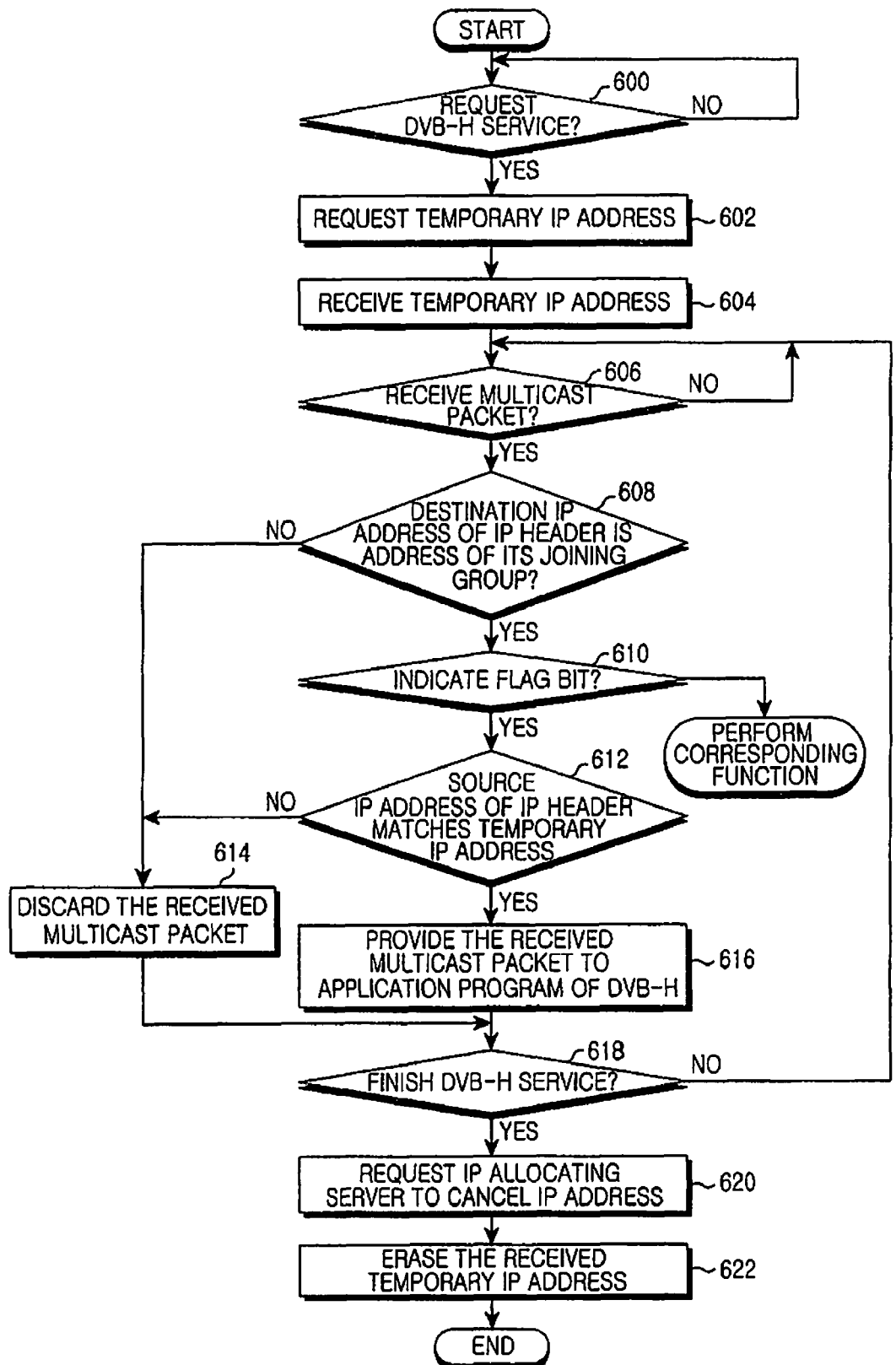
FIG. 6 is a flowchart of a method for receiving and processing the multicast packet at the receiver of the mobile digital broadcast system according to the present invention.

In FIG. 6, when detecting the viewing request of the digital broadcasting from the user in step 600, the receiver requests the IP allocating server to allocate a temporary IP address over the UMTS/GPRS network in step 602 and is assigned the temporary IP address from the IP allocating server in step 604.

In step 606, the receiver examines whether a multicast packet is received or not. When receiving the multicast packet, the receiver determines whether the destination IP address of the IP header is the address of the multicast group of the receiver based on the IP header of the multicast packet in step 608. When the destination IP address is different from the multicast group address, the receiver discards the received multicast packet in step 614.

When the destination IP address is the multicast group address in step 608, the receiver examines whether the multicast packet has the designated recipient based on the first bit of the flags of the IP header in step 610. When the first bit of the flags is '0' signifying no designated recipient, the receiver performs the subsequent processes as in the related art.

By contrast, when the first bit of the flags is '1' signifying the designated recipient in step 608, the receiver determines whether the receiver is the recipient of the multicast packet by examining whether the source IP address of the IP header matches the temporary IP address assigned from the IP allocating server in step 612. When the two addresses are different from each other, the receiver is not the correct recipient of the multicast packet and thus discards the received multicast packet in step 614.

When the source IP address matches the temporary IP address in step 612, the receiver is the destined recipient of the multicast packet and thus provides the received multicast packet to the application program to view the digital broadcasting in step 616.

In step 618, the receiver determines whether the digital broadcast viewing is finished or not. When the digital broadcast viewing is not finished, the receiver goes back to step 606 and repeats steps 606 through 616.

When the digital broadcast viewing is finished in step 618, the receiver requests the IP allocating server to cancel the temporary IP address in step 620 and erases the allocated temporary IP address in step 622.

Figure 7:
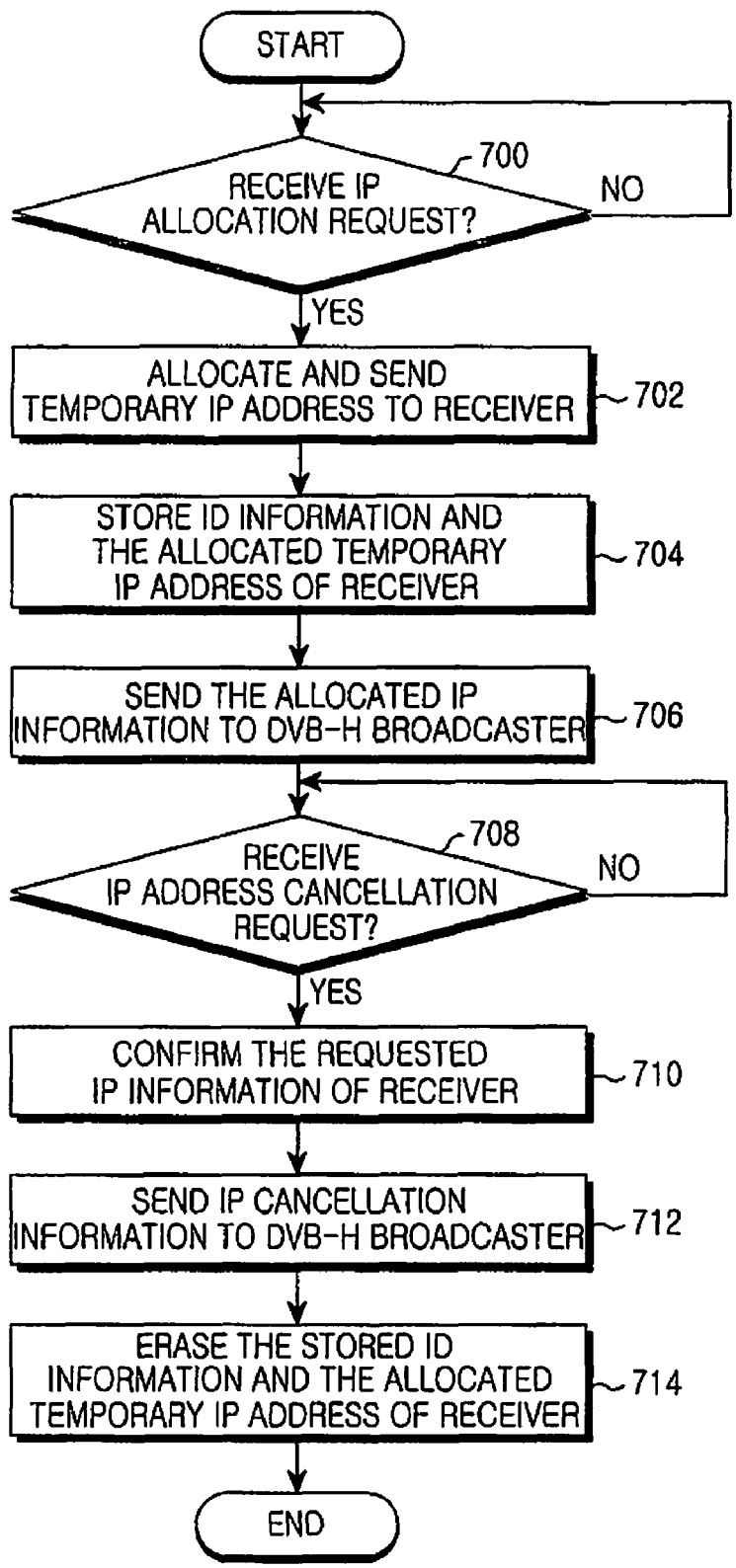
FIG. 7 is a flowchart of a method for allocating and canceling a temporary IP address at an IP allocating server of the mobile digital broadcast system according to the present invention.

Referring to FIG. 7, The IP allocating server communicates with the broadcaster and the receiver of the digital broadcast system over the UMTS/GPRS network. When the receiver requests the allocation of a temporary IP address in step 700, the IP allocating server allocates and sends the temporary IP address to the receiver in step 702, stores the temporary IP address and ID information of the receiver in step 704, and sends the allocated temporary IP address and the ID information of the receiver to the broadcaster in step 706.

When the receiver requests to cancel the allocated temporary IP address in step 708, the IP allocating server confirms the requested temporary IP address of the receiver in step 710, sends the temporary IP address to be canceled and the ID information of the receiver to the broadcaster in step 712, and erases the stored ID information and the allocated temporary IP address of the receiver in step 714.

As set forth above, the transmitter of the mobile digital broadcast system sends the EMM as the multicast packet containing the information relating to the receiver in the packet header. Hence, the receiver, upon receiving the multicast packet, can determine whether the received multicast packet is necessary merely based on the header information. Therefore, the load and the processing rate latency of the receiver can be reduced without having to check the unnecessary EMMs.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A mobile digital broadcast system for sending a multicast packet with a designated recipient, comprising:
   a broadcaster for indicating the designated recipient in an Internet Protocol (IP) header of a multicast packet and including a temporary IP address of the recipient in the IP header when multicasting data of the designated recipient;
   a receiver for receiving the multicast packet and providing the received multicast packet to an application program for outputting a digital broadcasting when the receiver joins a group of the received multicast packet and the recipient is designated to the receiver upon receiving the multicast packet; and
   an IP allocating server for allocating a temporary IP address when the receiver requests allocation of the temporary IP address, storing the allocated temporary IP address and ID information of the receiver, and sending the allocated temporary IP address and the ID information of the receiver to the broadcaster.

2. The mobile digital broadcast system of claim 1, wherein the receiver discards the received multicast packet when the group of the received multicast group is not the group joined by the receiver or when the receiver is not the designated recipient of the multicast packet.

3. The mobile digital broadcast system of claim 1, wherein, when the receiver requests to cancel the allocated temporary IP address, the IP allocating server sends the temporary IP address to be canceled and the ID information of the receiver requesting the cancellation to the broadcaster, and cancels the allocated temporary IP address.

4. The mobile digital broadcast system of claim 1, wherein the broadcaster comprises:
   a Conditional Access System (CAS) for generating an Entitlement Management Message (EMM) including authority to view a scrambled broadcasting;
   an Internet Protocol (IP) manager for receiving and managing a temporary IP address of a receiver, which is a recipient, from the IP allocating server; and
   an IP packet encapsulator for indicating a recipient in an IP header of a generated multicast packet when receiving the EMM from the CAS, including a temporary IP address in the IP header by confirming the temporary IP address of the recipient through the IP manager, and generating the multicast packet with the IP header appended to the EMM.

5. The mobile digital broadcast system of claim 4, wherein, when the IP allocating server informs of the cancellation of the allocated temporary IP address, the IP manager erases the managing temporary IP address of the receiver.

6. The mobile digital broadcast system of claim 4, wherein the IP packet encapsulator indicates that the multicast packet has the designated recipient by setting a first bit of flags of the IP header to '1'.

7. The mobile digital broadcast system of claim 4, wherein the IP packet encapsulator inputs the temporary IP address of the receiver being the recipient in a source IP address field of the IP header.

8. The mobile digital broadcast system of claim 1, wherein the receiver comprises:
   an Internet Protocol (IP) manager for requesting the IP allocating server to allocate a temporary IP address over a network when a digital broadcast viewing is requested, receiving and managing the temporary IP address from the IP allocating server; and
   an IP layer for providing the received multicast packet to an application program for outputting the digital broadcast when a group of the multicast group is joined by the receiver and the recipient of the multicast group is designated to the receiver.

9. The mobile digital broadcast system of claim 8, wherein the IP manager requests the IP allocating server to cancel the allocated temporary IP address over the network when the digital broadcast viewing is finished, and erases the managing temporary IP address.

10. The mobile digital broadcast system of claim 8, wherein the IP layer discards the received multicast packet when the group of the received multicast packet is not the group joined by the receiver or when the receiver is not the designated recipient of the multicast packet.

11. The mobile digital broadcast system claim 10, wherein the IP layer determines whether the receiver is the designated recipient of the multicast packet by comparing a source IP address of the IP header with the temporary IP address allocated from the IP allocating server, and determines that the receiver is the designated recipient of the multicast packet when the source IP address and the temporary IP address match.

12. A method for sending a multicast packet with a designated recipient in a broadcaster of a mobile digital broadcast system, the method comprising:
   generating, by the broadcaster, an Entitlement Management Message (EMM) including authority to view a scrambled broadcasting;
   indicating a recipient in an Internet Protocol (IP) header of a multicast packet including the EMM;
   confirming a temporary IP address of the recipient;
   inputting the temporary IP address in the IP header of the multicast packet; and
   outputting the multicast packet with an appended IP header.

13. The method of claim 12, wherein the recipient indicating step indicates that the multicast packet has the designated recipient by setting a first bit of flags of the IP header to '1'.

14. The method of claim 12, wherein the temporary IP address input step inputs the temporary IP address of a receiver being the recipient in a source IP address field of the IP header.

15. The method of claim 12, further comprising:
   receiving and storing the temporary IP address of the recipient from an IP allocating server before generating the EMM.

16. The method of claim 15, further comprising:
   erasing the stored temporary IP address, when the IP allocating server requests to cancel the temporary IP address of the recipient after outputting the multicast packet.

17. A method for receiving a multicast packet with a designated recipient in a receiver of a mobile digital broadcast system, the method comprising:
   determining, by the receiver, whether a group of the received multicast packet is the group joined by the receiver when receiving the multicast packet;
   determining whether a recipient of the multicast packet is designated or not by examining an Internet Protocol (IP) header of the multicast packet when the receiver joins the group of the received multicast packet;
   determining whether the receiver is the designated recipient of the multicast packet by examining the IP header of the multicast packet when the recipient of the multicast packet is designated; and
   providing a received multicast packet to an application program to view a digital broadcasting when the receiver is the designated recipient of the multicast packet.

18. The method of claim 17, further comprising:
   requesting, before receiving the multicast packet, an IP allocating server to allocate a temporary IP address when the digital broadcast viewing is requested; and
   receiving and storing the temporary IP address from the IP allocating server.

19. The method of claim 18, further comprising:
   requesting, after receiving and storing the temporary IP address, to cancel the temporary IP address assigned by the IP allocating server when the digital broadcast viewing is finished; and
   erasing the stored temporary IP address.

20. The method of claim 18, further comprising determining that the receiver is the designated recipient of the multicast packet when a source IP address of the IP header matches the temporary IP address assigned by the IP allocating server.

21. The method of claim 17, wherein the designated recipient determining step determines that the recipient of the multicast packet is designated when a first bit of flags of the IP header is set to '1'.

22. A method for allocating a temporary IP address for sending and receiving a multicast packet with a designated recipient in an Internet Protocol (IP) allocating server of a mobile digital broadcast system, the method comprising:
   allocating and sending, by the IP allocating server, a temporary IP address to a receiver when the receiver requests to allocate a temporary IP address;
   storing the allocated temporary IP address and ID information of the receiver; and
   sending the allocated temporary IP address and the ID information of the receiver to a broadcaster of the mobile digital broadcast system.

23. The method of claim 22, further comprising:
   confirming the temporary IP address of the receiver and informing the broadcaster of the cancellation by sending the temporary IP address to be canceled and the ID information of the receiver requesting a cancellation when the receiver requests to cancel the allocated temporary IP address after allocating and sending the temporary IP address to the receiver; and
   canceling the temporary IP address by erasing the ID information and the allocated temporary IP address of the receiver from the IP allocating server.

* * * * *